United States Patent
Yu

(10) Patent No.: US 10,915,170 B2
(45) Date of Patent: Feb. 9, 2021

(54) EYE-PROTECTION DISPLAY DEVICE AND METHOD

(71) Applicant: BOE TECHNOLOGY GROUP CO., LTD., Beijing (CN)

(72) Inventor: Jing Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 49 days.

(21) Appl. No.: 16/331,261

(22) PCT Filed: May 11, 2018

(86) PCT No.: PCT/CN2018/086414
§ 371 (c)(1),
(2) Date: Mar. 7, 2019

(87) PCT Pub. No.: WO2018/214751
PCT Pub. Date: Nov. 29, 2018

(65) Prior Publication Data
US 2019/0220091 A1 Jul. 18, 2019

(30) Foreign Application Priority Data
May 25, 2017 (CN) .......................... 2017 1 0378732

(51) Int. Cl.
*G06F 3/01* (2006.01)
*G06F 1/16* (2006.01)
*G09G 5/00* (2006.01)

(52) U.S. Cl.
CPC ............ *G06F 3/013* (2013.01); *G06F 1/1601* (2013.01); *G06F 3/011* (2013.01); *G09G 5/00* (2013.01)

(58) Field of Classification Search
CPC ........ G06F 1/1601; G06F 3/011; G06F 3/013; G06F 3/147; G09G 2354/00; G09G 5/00
See application file for complete search history.

(56) References Cited

U.S. PATENT DOCUMENTS 7,626,569 B2 * 12/2009 Lanier .................. G06F 1/1601
345/156
9,298,254 B2 * 3/2016 Ha ............................ G06F 3/01
(Continued)

FOREIGN PATENT DOCUMENTS

| CN | 103760971 A | 4/2014 |
| CN | 205015809 U | 2/2016 |

(Continued)

OTHER PUBLICATIONS

First Office Action for Chinese Application No. 201710378732.8, dated Apr. 23, 2019, 12 Pages.
(Continued)

*Primary Examiner* — Dmitriy Bolotin
(74) *Attorney, Agent, or Firm* — Brooks Kushman P.C.

(57) ABSTRACT

An eye-protection display device (1) and method are provided. The device (1) includes; a display screen (10); a distance detection module (20), configured to detect a vertical distance between a location of two eyes of a user and the display screen (10); a control module (30) to send first control information to an execution module (40) when a detection result of the distance detection module (20) includes at least a case that the vertical distance between the location of the two eyes and the display screen (10) is not a set distance; and the execution module (40) configured to control the display screen (10) to move according to the first control information, so that the vertical distance between the location of the two eyes and the display screen (10) is the set distance.

18 Claims, 3 Drawing Sheets

(56) References Cited

U.S. PATENT DOCUMENTS

| | | | | |
|---|---|---|---|---|
| 2004/0179714 A1* | 9/2004 | Jouppi | ............ | H04N 7/144 382/103 |
| 2004/0183750 A1* | 9/2004 | Nagano | ............ | G02B 27/0101 345/7 |
| 2007/0230797 A1* | 10/2007 | Hisanaga | ............ | A61B 3/113 382/195 |
| 2009/0239579 A1* | 9/2009 | Lee | ............ | G06F 1/1626 455/556.1 |
| 2010/0185990 A1* | 7/2010 | Ha | ............ | G06F 3/01 715/863 |
| 2012/0038627 A1 | 2/2012 | Sung et al. | | |
| 2012/0050138 A1* | 3/2012 | Sato | ............ | G02B 27/017 345/4 |
| 2012/0066705 A1* | 3/2012 | Harada | ............ | H04N 21/4662 725/12 |
| 2014/0293020 A1* | 10/2014 | Uehara | ............ | H04N 13/376 348/51 |
| 2015/0177906 A1* | 6/2015 | Yairi | ............ | G06F 3/016 345/648 |
| 2016/0057412 A1* | 2/2016 | Lee | ............ | H04N 13/366 348/51 |
| 2016/0209663 A1* | 7/2016 | Hirokawa | ............ | G06K 9/00604 |
| 2017/0115732 A1* | 4/2017 | Lian | ............ | G09G 5/38 |
| 2017/0278476 A1 | 9/2017 | Yu | | |
| 2017/0336632 A1* | 11/2017 | Ushida | ............ | G02B 27/01 |

FOREIGN PATENT DOCUMENTS

| | | |
|---|---|---|
| CN | 105892647 A | 8/2016 |
| CN | 103439794 B | 1/2017 |
| CN | 107219889 A | 9/2017 |

OTHER PUBLICATIONS

International Search Report and Written Opinion for Application No. PCT/CN2018/086414, dated Aug. 15, 2018, 10 Pages.

* cited by examiner

EYE-PROTECTION DISPLAY DEVICE AND METHOD

CROSS-REFERENCE TO RELATED APPLICATIONS

This application is the U.S. national phase of PCT Application No. PCT/CN2018/086414 filed on May 11, 2018, which claims priority to Chinese Patent Application No. 201710378732.8 filed on May 25, 2017, which are incorporated herein by reference in their entireties.

TECHNICAL FIELD

The present disclosure relates to the field of display technology, and specifically relates to an eye-protection display device and an eye-protection display method.

BACKGROUND

With rapid development of display technology, people increasingly tend to browse or view information through a display terminal, and the display terminal has become an indispensable part of people's life. Bringing a better viewing experience to users is always the unremitting pursuit in the field of display technology. Besides an image quality of the display terminal, users may also realize a human-machine interaction by a touch control function. However, if eyes of a user are too close to or too far from a screen for a long time, the eyes of the users may be damaged to a certain extent.

SUMMARY

An eye-protection display device and an eye-protection display method are provided in the present disclosure.

In a first aspect, an eye-protection display device is provided in the present disclosure and includes a display screen, a distance detection module, a control module and an execution module. The distance detection module is configured to detect a vertical distance between a location of two eyes of a reference user and the display screen; the control module is configured to send first control information to the execution module under a condition that a detection result of the distance detection module includes at least a case that the vertical distance between the location of the two eyes and the display screen is not a set distance; and the execution module is configured to control the display screen to move according the first control information, so that the vertical distance between the location of the two eyes and the display screen is the set distance.

Optionally, the control module is further configured to send the first control information to the execution module, under a condition that the detection result of the detection module includes at least a case that the vertical distance between the location of the two eyes and the display screen is not the set distance and a case that a duration for which the two eyes gaze at the display screen exceeds a set value.

Optionally, the eye-protection display device further includes a set-distance acquisition module, wherein the set-distance acquisition module is configured to acquire the set distance according to a numerical value entered manually by the user, when a distance protection mode is turned on by the eye-protection display device; or the set-distance acquisition module is configured to acquire the set distance from the detection result of the distance detection module under a condition that a set condition is satisfied, when the distance protection mode is turned on by the eye-protection display device and the display screen is adjusted to a first location by the user, wherein the set distance is a distance between the location of the two eyes and the display screen located at the first location, and the set condition includes a condition that a duration for which the two eyes gaze at the display screen exceeds a set value or a condition that the user performs a confirming operation after the display screen is adjusted to the first location.

Optionally, the distance detection module includes an information acquisition unit. The information acquisition unit is configured for acquiring at least one of gazing angle information or gazing point location information of sight lines of the two eyes of the reference user relative to the display screen, wherein the gazing angle information includes an average value of two included angles between the sight lines of the two eyes of the reference user and a plane in which the display screen is located, and the gazing point location information includes information on intersection points at which the sight lines of the two eyes of the reference user intersect the plane in which the display screen is located; and a distance detection unit for detecting the vertical distance between the location of the two eyes of the reference user and the display screen.

Optionally, the information acquisition unit is further configured to acquire the gazing angle information of eyes of a plurality of users relative to the display screen when the plurality of users watches the display screen; the distance detection module further includes a determination unit, the determination unit is configured to find a minimum value from absolute values of difference values between the gazing angle information of each of the plurality of users and 90 degrees, and determine a user corresponding to the minimum value as the reference user; and the distance detection unit is further configured to detect the vertical distance between the location of the two eyes of the reference user and the display screen.

Optionally, the control module is further configured to determine, according to the gazing point location information, a reference point location to which the display screen is to be adjusted, and the control module is further configured to send second control information to the execution module according to the gazing angle information, the reference point location and a current location of the display screen; and the execution module is further configured to perform adjustment to an angle and a location of the display screen according to the second control information, so that a plane in which the display screen is located after the adjustment is performed is perpendicular to the sight lines of the two eyes of the reference user and a central location of the display screen is adjusted to coincide with the reference point location.

Optionally, the information acquisition unit is further configured to acquire at least one of the gazing angle information or the gazing point location information of the two eyes relative to the display screen, under a condition that a duration for which the two eyes gaze at the display screen exceeds a set time.

Optionally, under a condition that the gazing point location information includes information on locations of two intersection points at which the sight lines of the two eyes of the reference user intersect the plane in which the display screen is located, respectively, the reference point location is a central point of a connection line between the two intersection points; or under a condition that the gazing point location information includes information on a location of an intersection point at which one of the sight lines of the two eyes of the reference user intersects the plane in which the display screen is located, the reference point location is the location of the intersection point.

Optionally, the eye-protection display device further includes a human-machine interaction module for enabling the user to turn on or turn off a distance protection mode and turn on or turn off an optimum viewing point mode.

In a second aspect, an eye-protection display method executed by the eye-protection display device according to the first aspect is provided in the present disclosure and includes: detecting the vertical distance between the location of two eyes of the reference user and the display screen; and controlling the display screen to move under a condition that the detection result of the distance detection module includes at least the case that the vertical distance between the two eyes and the display screen is not the set distance, so that the distance between the location of the two eyes and the display screen is the set distance.

Optionally, the controlling the display screen to move under the condition that the detection result of the distance detection module includes at least the case that the vertical distance between the two eyes and the display screen is not the set distance, so that the distance between the location of the two eyes and the display screen is the set distance, further includes: controlling the display screen to move under a condition that the detection result of the distance detection module includes at least the case that the vertical distance between the location of the two eyes and the display screen is not the set distance and a case that a duration for which the two eyes gaze at the display screen exceeds the set value, so that the distance between the location of the two eyes and the display screen is the set distance.

Optionally, the eye-protection display method further includes: acquiring the set distance according to a numerical value entered manually by the user, under a condition that the distance protection mode is turned on; or, acquiring the set distance from the detection result of the distance detection module under a condition that the set condition is satisfied, when the distance protection mode is turned on and the display screen is adjusted to the first location by the user, wherein the set distance is the vertical distance between the location of the two eyes and the display screen located at the first location, and the set condition includes a condition that a duration for which the two eyes gaze at the display screen exceeds the set value or a condition that the user performs a confirming operation after the display screen is adjusted to the first location.

Optionally, the eye-protection display method further includes: acquiring at least one of gazing angle information or gazing point location information of the two eyes of the reference user relative to the display screen, wherein the gazing angle information includes an average value of two included angles between sight lines of the two eyes of the reference user and a plane in which the display screen is located, and the gazing point location information includes information on locations of intersection points at which the sight lines of the two eyes of the reference user intersect the plane in which the display screen is located.

Optionally, when a plurality of users watches the display screen, prior to detecting the distance between the location of the two eyes of the reference user and the display screen, the eye-protection display method further includes: acquiring gazing angle information of eyes of the plurality of users relative to the display screen; and finding a minimum value from absolute values of difference values between the gazing angle information of each of the plurality of users and 90 degrees, and determining a user corresponding to the minimum value as the reference user.

Optionally, the eye-protection display method further includes: determining, according to the gazing point location information, a reference point location to which the display screen is to be adjusted; and performing adjustment to an angle and a location of the display screen according to the gazing angle information, a reference point location and a current location of the display screen, so that a plane in which the display screen is located after the adjustment is performed is perpendicular to sight lines of the two eyes of the reference user and a central location of the display screen is adjusted to coincide with the reference point location.

Optionally, the acquiring at least one of the gazing angle information or the gazing point location information of the two eyes of the reference user relative to the display screen, further includes: acquiring at least one of the gazing angle information or the gazing point location information of the two eyes of the reference user relative to the display screen, under a condition that a duration for which the two eyes gaze at the display screen exceeds a set time.

Optionally, under a condition that the gazing point location information includes information on locations of two intersection points at which sight lines of the two eyes of the reference user intersect a plane in which the display screen is located, respectively, the reference point location is a central point of a connection line between the two intersection points; or under a condition that the gazing point location information includes information on a location of one intersection point at which one of the sight lines of the two eyes of the reference user intersects the plane in which the display screen is located, the reference point location is the location of the intersection point.

DETAILED DESCRIPTION

Features and principles of the present disclosure will be described specifically hereinafter in conjunction with accompanying drawings. The embodiments described below are only used to explain the present disclosure, rather than to limit the protection scope of the present disclosure.

Figure 1:
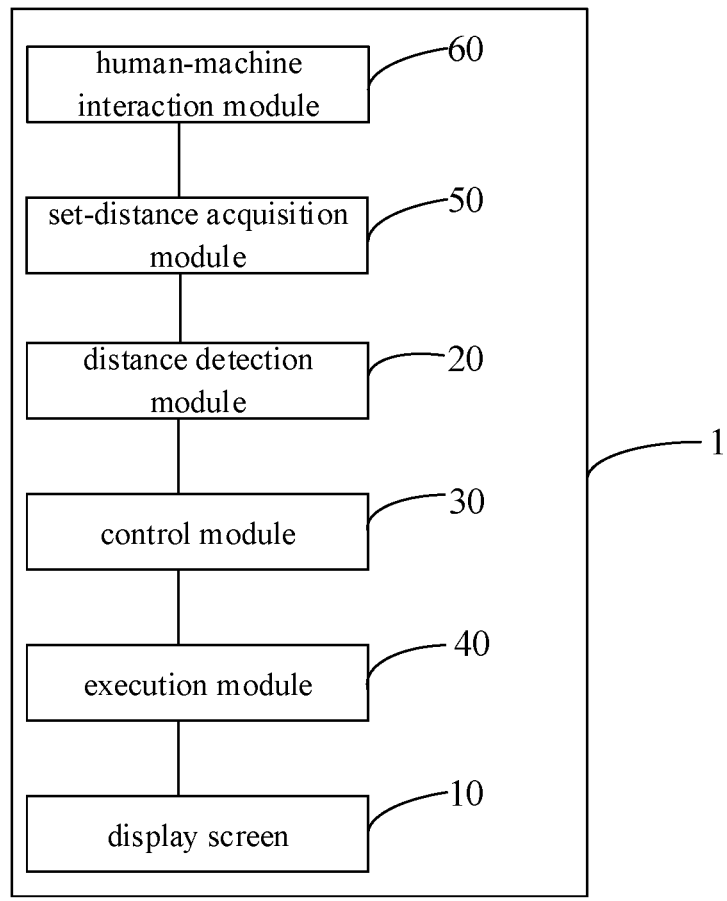
FIG. 1 illustrates a schematic structural diagram of an eye-protection display device according to some embodiments of the present disclosure.

As shown in FIG. 1, the present disclosure provides an eye-protection display device 1. The eye-protection display device 1 includes a display screen 10, a distance detection module 20, a control module 30 and an execution module 40. The display screen 10 is used for displaying images. The distance detection module 20 is configured to detect a vertical distance between a location of two eyes of a user and the display screen 10. The control module 30 is configured to send first control information to the execution module 40 when a detection result from the distance detection module 20 includes at least a case that the vertical distance between the location of the two eyes of the user and the display screen 10 is not a set distance. The execution module 40 is configured to control the display screen 10 to move according to the first control information, so that the vertical distance between the location of the two eyes of the user and the display screen 10 is the set distance.

The eye-protection display device 1 according to the present disclosure may automatically adjust the distance between the location of the two eyes of the user and display screen 10 to be the set distance, so as to prevent the distance between the display screen 10 and the location of the two eyes of the user from being too short or too long, thus a function of protecting the eyes is achieved.

When the distance detection module 20 detects that the distance between the location of the two eyes of the user and the display screen 10 is not the set distance, the control module 30 may send the first control information to the execution module 40 in real time. The execution module 40 may adjust a location of the display screen 10 in real time according to the first control information, so that the distance between the display screen 10 and the location of the two eyes of the user is constantly kept to the set distance, and thus an effect of protecting the eyes of the user is achieved.

If the user frequently changes the location of the two eyes, the location of the display screen 10 is adjusted in real time, and thus viewing experience of the user will be adversely affected. In order to improve the viewing experience of the user, in some embodiments of the present disclosure, under a condition that the detection result from the distance detection module 20 includes the case that the vertical distance between the location of the two eyes of the user and the display screen 10 is not the set distance and a case that a duration for the case that the vertical distance between the location of the two eyes of the user and the display screen 10 is not the set distance exceeds a set time (the set time may be set by default in the eye-protection display device, and may also be set by the user voluntarily according to practical requirements), the control module 30 may send the first control information to the execution module 40. The execution module 40 controls display screen 10 to move according to the first control information, so that the distance between the location of the two eyes of the user and the display screen 10 is the set distance, and thus eyes are protected and the experience of the user is improved.

The set distance may be acquired automatically by the eye-protection display device 1, and may also be set manually by the user. In some embodiments of the present disclosure, the eye-protection display device 1 may also include a set-distance acquisition module 50. The set-distance acquisition module 50 is configured to acquire the set distance according to a numerical value that is entered manually by the user, when a distance protection mode is turned on by the eye-protection display device 1; or the set-distance acquisition module 50 is configured to acquire the set distance from the detection result of the distance detection module 20 under a condition that a set condition is satisfied, when the distance protection mode is turned on by the eye-protection display device 1 and the display screen 10 is adjusted to a first location by the user, wherein the set distance is a distance between the location of the two eyes of the user and the display screen 10 located at the first location.

Furthermore, the set condition includes a condition that a duration for which the user fixes the two eyes on the display screen 10 exceeds a set value, or a condition that the user performs a confirming operation after the user adjusts the display screen 10 to the first location.

The set value may be chosen to be 3 seconds, longer than 3 seconds or shorter than 3 seconds, and the set value may be modified and set voluntarily by the user according to practical requirements.

The eye-protection display device 1 according to the present disclosure may also adjust angles between sight lines of the user's two eyes and a plane in which the display screen 10 is located when an optimum viewing point mode is turned on by the user, so as to provide the user's two eyes with an optimum viewing location. In some embodiments of the present disclosure, referring to FIG. 2, the distance detection module 20 may include an information acquisition unit 201 and a distance detection unit 202. The information acquisition unit 201 is configured to, when the optimum viewing point mode is turned on, acquire at least one of gazing angle information or gazing point location information of sight lines of the user's two eyes relative to the display screen 10. The gazing angle information is an average value of two included angles between the sight lines of the user's two eyes and the plane in which the display screen 10 is located, wherein the two included angles are included angles between the sight lines and the plane in which the display screen is located, and a value range of the included angles is greater than 0 degree and less than or equal to 90 degrees, and the gazing point location information is information on an intersection location of the sight lines of the user's two eyes and the plane in which the display screen 10 is located. The distance detection unit 202 is configured to detect the vertical distance between the location of the user's two eyes and display screen 10.

When a plurality of users views a same display screen 10, a location of two eyes of one of the plurality of users needs to be determined as a reference user eye location so as to facilitate the distance detection module 20 detecting the distance between a location of two eyes and the display screen 10. In some embodiments of the present disclosure, when the plurality of users views the display screen 10, the information acquisition unit 201 is further configured to acquire gazing angle information of eyes of the plurality of users relative to the display screen 10. The distance detection module 20 further includes a determination unit 203. The determination unit 203 is configured for finding a minimum value from absolute values of difference values between gazing angle information (i.e., an average value of two included angles between sight lines of two eyes of each of the plurality of users and the plane in which the display screen is located) of the each of the plurality of users and 90 degrees, and determining one or more users corresponding to the minimum value as the reference user. The distance detection unit 202 is further configured to detect a vertical distance between a location of two eyes of the reference user and the display screen 10.

In some embodiments of the present disclosure, the determination unit 203 chooses a user of the plurality of users as the reference user, wherein an average value of two included angles between sight lines of two eyes of the reference user and the plane in which the display screen 10 is located is closest to 90 degrees. The distance detection unit 202 detects a distance between the location of the two eyes of the reference user and the display screen 10. When the distance detection unit 202 detects that the distance between the location of the two eyes of the reference user and the display screen 10 is not the set distance, the control module 30 sends the first control information to the execution module 40.

In some embodiments of the present disclosure, the eye-protection display device 1 further includes a human-machine interaction module 60. The human-machine interaction module 60 is configured for at least enabling the user to choose to turn on or turn off the distance protection mode and turn on or turn off the optimum viewing point mode.

In some embodiments of the present disclosure, the control module 30 is further configured to determine, according to the gazing point location information, a reference point location to which the display screen 10 is to be adjusted, and send second control information to the execution module 40 according to the gazing angle information, the reference point location and a current location of the display screen 10. The execution module 40 is further configured to perform an adjustment to an angle (i.e., perform a rotation) and a location (i.e., perform a translation) of the display screen 10 according to the second control information, so that a plane in which the display screen 10 is located after the adjustment is made is perpendicular to the sight lines of the two eyes of the user and a central location of the display screen 10 is adjusted to coincide with the reference point location.

In some embodiments of the present disclosure, the angle and location of the display screen 10 is automatically adjusted according to the gazing angle information, the reference point location and the current location of the display screen 10, without requiring the user to perform the adjustment manually, thus the user's viewing experience is improved.

It should be noted that, there is one or two intersection points at which the sight lines of the two eyes of the user intersect the plane in which the display screen 10 is located. In specific implementations, the above gazing angle information and the gazing point location information may be determined by acquiring location coordinates of two pupils of the two eyes, gazing angles of the two eyes and so on. For example, when acquiring a certain location on the display screen 10 at which one pupil of the two pupils gazes, a two-dimensional coordinate of an intersection point at which one of the sight lines corresponding to the pupil intersects the plane in which the display screen 10 is located is determined, thereby determining the above gazing point location information. Then, a three-dimensional coordinate of one pupil is acquired, thereby determining the gazing angle information in conjunction with the above gazing point location information. In addition, manners for determining the above gazing angle information and the gazing point location information by acquiring other parameters are not limited herein.

Furthermore, the information acquisition unit 201 is configured to acquire the gazing angle information and the gazing point location information of the eyes of the user when a duration for which the eyes of the user gaze at the display screen 10 exceeds a set time.

It should be noted that, in order to avoid mis-adjustments of the display screen 10 due to rapid movements of the user's sight lines, in some embodiments of the present disclosure, information on the user's sight lines relative to the display screen 10 acquired when a duration for which the sight lines of the user's two eyes remain fixed exceeds the set time includes the gazing angle information and the gazing point location information. When the information acquisition unit 201 acquires the above gazing angle information and the gazing point location information, the information acquisition unit 201 may acquire gazing time information simultaneously, and the gazing time information may include a time point at which the user's sight lines enter the display screen 10 for a first time, a gazing time point of a first detected gazing point and a duration for which the gazing point is fixed at a same location and so on. When a duration for which the user's sight lines are fixed at a certain location on the display screen 10 exceeds 3 seconds or more than 3 seconds, the gazing angle information and gazing point location information of the user's two eyes relative to the display screen 10 are acquired. In specific implementations, other time may be set as the above set time, which is not limited herein.

In some embodiments of the present disclosure, when the gazing point location information includes locations of two intersection points at which the sight lines of the user's two eyes intersect the plane in which the display screen 10 is located respectively, the reference point location is a central point of a connection line between the two intersection points; and when the gazing point location information includes a location of an intersection point at which one of the sight lines of the user's two eyes intersects the plane in which the display screen 10 is located, the reference point location is the location of the intersection point.

In specific implementations, in order to provide the user with better viewing experience, adjustment to the gazing angle of the user's two eyes relative to the display screen 10 is performed, so that a plane in which the display screen 10 is located after the adjustment is performed is perpendicular to a plane in which the sight lines of the user's two eyes are located, i.e., the gazing angle after the adjustment is performed is an angle of 90 degrees. According to different requirements of users, the gazing angle after the adjustment is performed may also be other angles such as an angle of 60 degrees, an angle of 70 degrees, and the like, which will not be specifically limited in the present disclosure. Further, after the above reference point location is determined, the location of the display screen 10 is adjusted such that the central location of the display screen 10 after the adjustment is performed coincides with the reference point location, for purpose of further improving the user's viewing experience. A sequence of the step of adjusting the angle of the display screen 10 and the step of adjusting the location of the display screen 10 may be interchanged. According to practical requirements, the sequence of the above two steps may be altered flexibly, which will not be limited in the present disclosure.

In the present disclosure, the distance detection module 20 may be an eye tracker. All of the eye tracker, the control module 30, the execution module 40 and the display screen 10 are integrated (for example, integrated to a robot). The eye tracker is configured to improve accuracies of the acquired distance between the location of the eyes of the user and display screen 10, the set distance, the gazing angle information and the gazing point location information. Using a feature of convenient movement of the robot, the user may be kept to maintain an optimum viewing distance when the user watches the display screen 10 to prevent eyes from being too close to or too far away from the screen, and the display screen 10 may be adjusted to be located at the optimum viewing angle, thus exerting the effect of protecting eyes. After the eye tracker acquires the above information, the acquired information is sent or transmitted to the above control module 30, and the angle or location to which the display screen 10 is to be adjusted is determined by the control module 30 so as to further determine an angle-to-be-adjusted, a distance-to-be-adjusted, and so on of the display screen 10, and the angle-to-be-adjusted and the distance-to-be-adjusted of the display screen 10 may be sent to the execution module 40 as movement instructions. The execution module 40 controls the display screen 10 to move according to the first control information or the second control information sent from the control module 30, thus improving the user's experience.

In the present disclosure, the execution module 40 includes a control element 401, for example, a bearing, that is connected to the display screen 10. The control element 401 is configured to control the angle and the reference point location of the display screen 10 under a control of the execution module 40.

Figure 2:
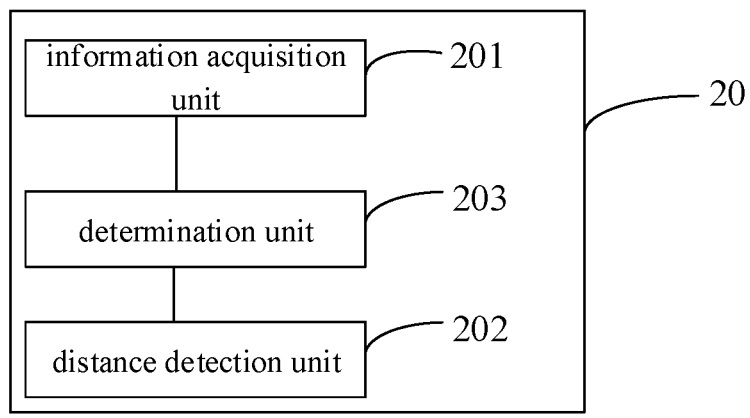
FIG. 2 illustrates a detail schematic structural diagram of modules of the eye-protection display device according to some embodiments of the present disclosure.

In some embodiments of the present disclosure, an eye-protection display method is provided. The eye-protection display method may be executed by the eye-protection display device according to the present disclosure. As shown in FIG. 2, the eye-protection display method includes following steps S202 to S203.

S202: detecting a vertical distance between locations of two eyes of a user and a display screen.

S203: controlling the display screen to move under a condition that a detection result of the distance detection module includes at least a case that the distance between the locations of the two eyes of the users and the display screen is not a set distance, so that the distance between the locations of the two eyes of the user and the display screen is the set distance.

Furthermore, prior to step S202, the eye-protection display method may further include a step S201.

S201: acquiring the set distance.

The step S201 may specifically include: acquiring the set distance according to a numerical value entered manually by the user, when a distance protection mode is turned on; or, acquiring the set distance from the detection result of the distance detection module under a condition that a set condition is satisfied, when the distance protection mode is turned on and the display screen is adjusted to a first location by the user, wherein the set distance is the vertical distance between the location of the two eyes of the user and the display screen located at the first location.

Furthermore, the set condition includes: a duration for which the eyes of the user stare at the display screen exceeds the set value; or the user performing a confirming operation after the user adjusts the display screen to the first location.

Furthermore, when the plurality of users views the display screen, the step S202 of detecting the vertical distance between the location of the two eyes of the reference user and the display screen includes substeps S2021 to S2023.

S2021: acquiring gazing angle information of eyes of the plurality of users relative to the display screen.

The gazing angle information is an average value of two included angles between sight lines of the two eyes of a user and the plane in which the display screen is located. These two included angles are included angles between sight lines and the plane in which the display screen is located and a value range of the two included angles is greater than 0 degree and less than or equal to 90 degrees.

S2022: finding a minimum value from absolute values of difference values between the gazing angle information of each of the plurality of users (i.e., the average value of the two included angles between sight lines of each user's two eyes and the plane in which the display screen is located) and 90 degrees, and determining the user corresponding to the minimum value as the reference user.

S2023: detecting the vertical distance between the location of the two eyes of the reference user and the display screen.

Figure 3:
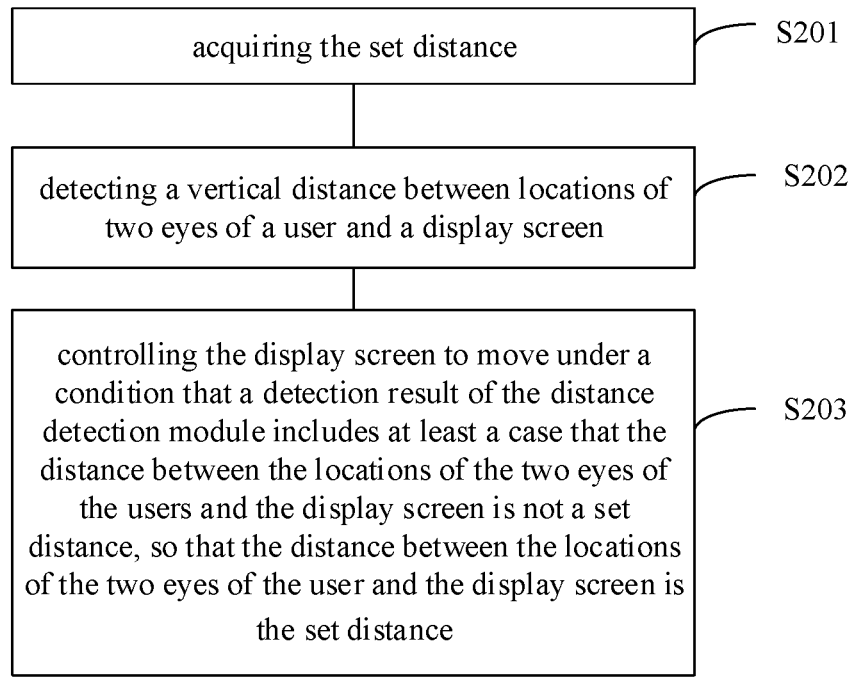
FIG. 3 illustrates a flowchart of an eye-protection display method according to some embodiments of the present disclosure.
Figure 4:
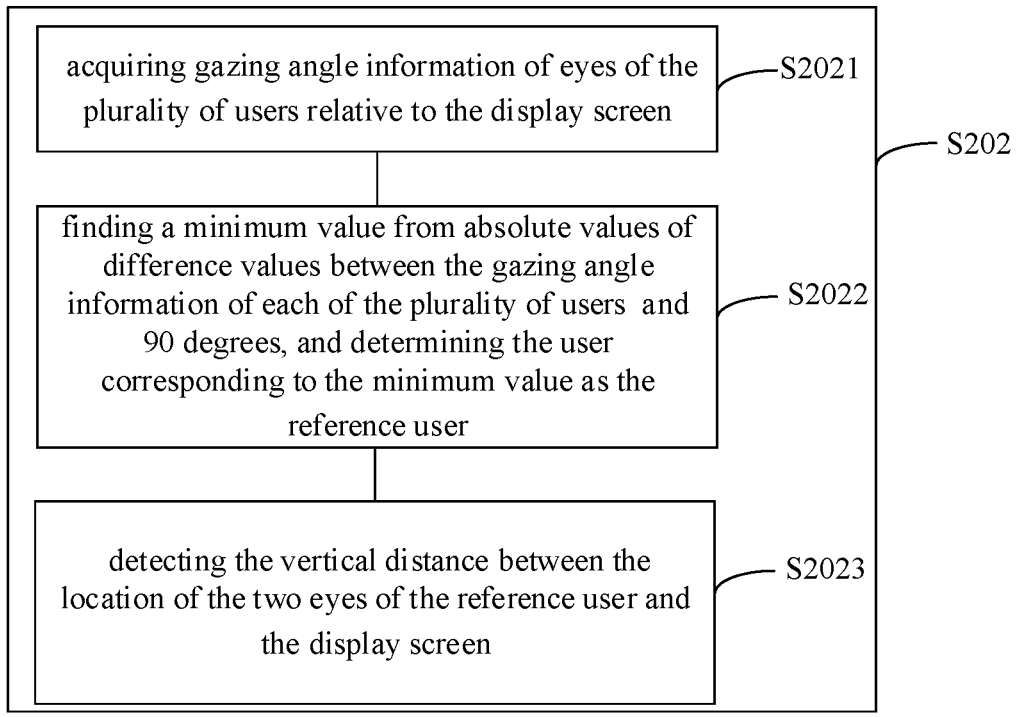
FIG. 4 illustrates a detailed flowchart of a step of the eye-protection display method according to some embodiments of the present disclosure.
Figure 5:
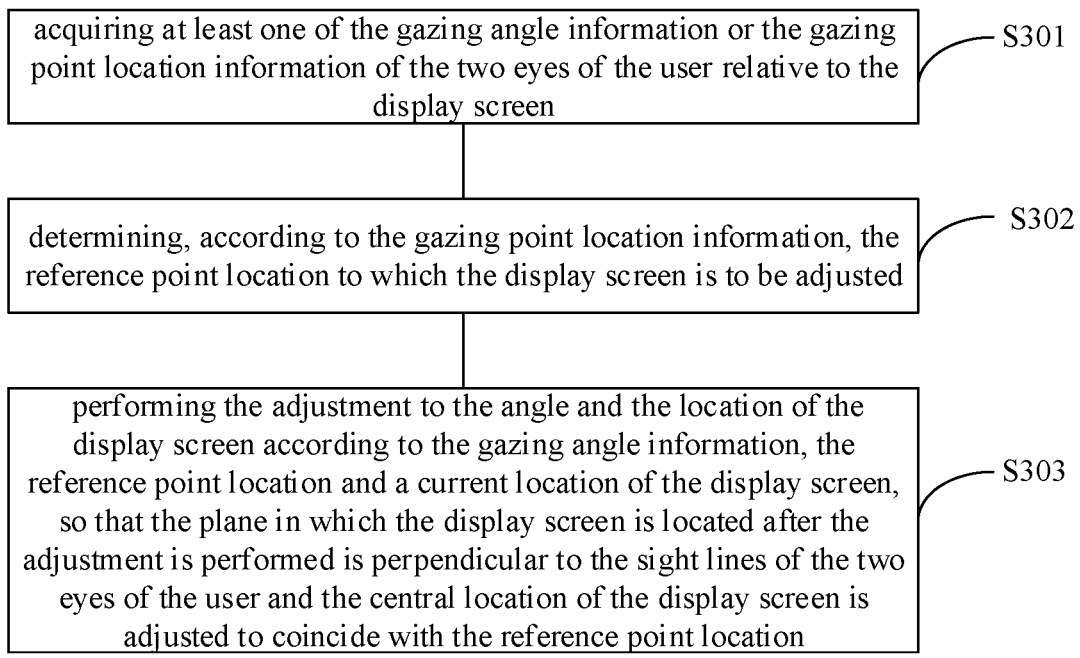
FIG. 5 illustrates a flowchart of an eye-protection display method according to some embodiments of the present disclosure.

As shown in FIG. 3, the eye-protection display method may further include following steps S301-S303.

S301: acquiring at least one of the gazing angle information or the gazing point location information of the two eyes of the user relative to the display screen, wherein the gazing angle information includes the average value of the two included angles between the sight lines of the two eyes of the users and the plane in which the display screen is located; and the gazing point location information includes the information on the location of the intersection points at which the sight lines of the two eyes of the user intersect the plane in which the display screen is located.

S302: determining, according to the gazing point location information, the reference point location to which the display screen is to be adjusted.

S303: performing the adjustment to the angle and the location of the display screen according to the gazing angle information, the reference point location and a current location of the display screen, so that the plane in which the display screen is located after the adjustment is performed is perpendicular to the sight lines of the two eyes of the user and the central location of the display screen is adjusted to coincide with the reference point location.

In the eye-protection display method according to some embodiments of the present disclosure, the adjustment on the angle and the location of the display screen may be performed so as to improve the viewing experience of the user.

The above are optional embodiments of the present disclosure. It should be noted that, a person skilled in the art may also make improvements and modifications without departing from the principle of the present disclosure, and these improvements and modifications shall also fall within the protection scope of the present disclosure.

What is claimed is:

1. An eye-protection display device, comprising:
   a display screen, a distance detection circuit, a control circuit and an execution mechanism;
   wherein the distance detection circuit is configured to detect a vertical distance between a location of two eyes of a reference user and the display screen;
   the control circuit is configured to send first control information to the execution mechanism under a condition that a detection result of the distance detection circuit comprises at least a case that the vertical distance between the location of the two eyes and the display screen is not a set distance; and
   the execution mechanism is configured to control the display screen to move according the first control information, so that the vertical distance between the location of the two eyes and the display screen is the set distance,
   the eye-protection display device further comprises a set-distance acquisition circuit, wherein
   the set-distance acquisition circuit is configured to acquire the set distance according to a numerical value entered manually by the user, when a distance protection mode is turned on by the eye-protection display device; or
   the set-distance acquisition circuit is configured to acquire the set distance from the detection result of the distance detection circuit under a condition that a set condition is satisfied, when the distance protection mode is turned on by the eye-protection display device and the display screen is adjusted to a first location by the user,
   wherein the set distance is a distance between the location of the two eyes and the display screen located at the first location, and the set condition comprises a condition that a duration for which the two eyes gaze at the display screen exceeds a set value or a condition that the user performs a confirming operation after the display screen is adjusted to the first location.

2. The eye-protection display device according to claim 1, wherein the control circuit is further configured to send the first control information to the execution mechanism, under a condition that the detection result of the detection circuit comprises at least the case that the vertical distance between the location of the two eyes and the display screen is not the set distance and a case that a duration for which the two eyes gaze at the display screen exceeds a set value.

3. The eye-protection display device according to claim 2, wherein the distance detection circuit comprises:

an information acquisition sub-circuit for acquiring at least one of gazing angle information or gazing point location information of sight lines of the two eyes of the reference user relative to the display screen, wherein the gazing angle information comprises an average value of two included angles between the sight lines of the two eyes of the reference user and a plane in which the display screen is located, and the gazing point location information comprises information on intersection points at which the sight lines of the two eyes of the reference user intersect the plane in which the display screen is located; and a distance detection sub-circuit for detecting the vertical distance between the location of the two eyes of the reference user and the display screen.

4. The eye-protection display device according to claim 1, wherein the distance detection circuit comprises:

an information acquisition sub-circuit for acquiring at least one of gazing angle information or gazing point location information of sight lines of the two eyes of the reference user relative to the display screen, wherein the gazing angle information comprises an average value of two included angles between the sight lines of the two eyes of the reference user and a plane in which the display screen is located, and the gazing point location information comprises information on intersection points at which the sight lines of the two eyes of the reference user intersect the plane in which the display screen is located; and a distance detection sub-circuit for detecting the vertical distance between the location of the two eyes of the reference user and the display screen.

5. The eye-protection display device according to claim 4, wherein the control circuit is further configured to determine, according to the gazing point location information, a reference point location to which the display screen is to be adjusted, and the control circuit is further configured to send second control information to the execution mechanism according to the gazing angle information, the reference point location and a current location of the display screen; and the execution mechanism is further configured to perform adjustment to an angle and a location of the display screen according to the second control information, so that a plane in which the display screen is located after the adjustment is performed is perpendicular to the sight lines of the two eyes of the reference user and a central location of the display screen is adjusted to coincide with the reference point location.

6. The eye-protection display device according to claim 5, wherein under a condition that the gazing point location information comprises information on locations of two intersection points at which the sight lines of the two eyes of the reference user intersect the plane in which the display screen is located, respectively, the reference point location is a central point of a connection line between the two intersection points; or under a condition that the gazing point location information comprises information on a location of an intersection point at which one of the sight lines of the two eyes of the reference user intersects the plane in which the display screen is located, the reference point location is the location of the intersection point.

7. The eye-protection display device according to claim 4, wherein the information acquisition sub-circuit is further configured to acquire at least one of the gazing angle information or the gazing point location information of the two eyes relative to the display screen, under a condition that a duration for which the two eyes gaze at the display screen exceeds a set time.

8. The eye-protection display device according to claim 1, further comprising:

a human-machine interaction circuit for enabling the user to turn on or turn off a distance protection mode and turn on or turn off an optimum viewing point mode.

9. An eye-protection display device, comprising:

a display screen, a distance detection circuit, a control circuit and an execution mechanism;

wherein the distance detection circuit is configured to detect a vertical distance between a location of two eyes of a reference user and the display screen;

the control circuit is configured to send first control information to the execution mechanism under a condition that a detection result of the distance detection circuit comprises at least a case that the vertical distance between the location of the two eyes and the display screen is not a set distance; and the execution mechanism is configured to control the display screen to move according the first control information, so that the vertical distance between the location of the two eyes and the display screen is the set distance, wherein the eye-protection display device further comprises:

an information acquisition sub-circuit for acquiring at least one of gazing angle information or gazing point location information of sight lines of the two eyes of the reference user relative to the display screen, wherein the gazing angle information comprises an average value of two included angles between the sight lines of the two eyes of the reference user and a plane in which the display screen is located, and the gazing point location information comprises information on intersection points at which the sight lines of the two eyes of the reference user intersect the plane in which the display screen is located; and a distance detection sub-circuit for detecting the vertical distance between the location of the two eyes of the reference user and the display screen, wherein the information acquisition sub-circuit is further configured to acquire the gazing angle information of eyes of a plurality of users relative to the display screen when the plurality of users watches the display screen;

the distance detection circuit further comprises a determination sub-circuit, the determination sub-circuit is configured to find a minimum value from absolute values of difference values between the gazing angle information of each of the plurality of users and 90 degrees, and determine a user corresponding to the minimum value as the reference user; and the distance detection sub-circuit is further configured to detect the vertical distance between the location of the two eyes of the reference user and the display screen.

10. The eye-protection display device according to claim 9, wherein the control circuit is further configured to determine, according to the gazing point location information, a reference point location to which the display screen is to be adjusted, and the control circuit is further configured to send second control information to the execution mechanism according to the gazing angle information, the reference point location and a current location of the display screen; and the execution mechanism is further configured to perform adjustment to an angle and a location of the display screen according to the second control information, so that a plane in which the display screen is located after the adjustment is performed is perpendicular to the sight lines of the two eyes of the reference user and a central location of the display screen is adjusted to coincide with the reference point location.

11. An eye-protection display method executed by an eye-protection display device including a display screen, a distance detection circuit, a control circuit and an execution mechanism;

wherein the distance detection circuit is configured to detect a vertical distance between a location of two eyes of a reference user and the display screen;

the control circuit is configured to send first control information to the execution mechanism under a condition that a detection result of the distance detection circuit comprises at least a case that the vertical distance between the location of the two eyes and the display screen is not a set distance; and the execution mechanism is configured to control the display screen to move according the first control information, so that the vertical distance between the location of the two eyes and the display screen is the set distance, the eye-protection display device further comprises a set-distance acquisition circuit, wherein the set-distance acquisition circuit is configured to acquire the set distance according to a numerical value entered manually by the user, when a distance protection mode is turned on by the eye-protection display device; or the set-distance acquisition circuit is configured to acquire the set distance from the detection result of the distance detection circuit under a condition that a set condition is satisfied, when the distance protection mode is turned on by the eye-protection display device and the display screen is adjusted to a first location by the user, wherein the set distance is a distance between the location of the two eyes and the display screen located at the first location, and the set condition comprises a condition that a duration for which the two eyes gaze at the display screen exceeds a set value or a condition that the user performs a confirming operation after the display screen is adjusted to the first location, wherein the eye-protection display method comprising:

detecting the vertical distance between the location of two eyes of the reference user and the display screen; and controlling the display screen to move under a condition that the detection result of the distance detection circuit comprises at least the case that the vertical distance between the two eyes and the display screen is not the set distance, so that the distance between the location of the two eyes and the display screen is the set distance.

12. The eye-protection display method according to claim 11, wherein the controlling the display screen to move under the condition that the detection result of the distance detection circuit comprises at least the case that the vertical distance between the two eyes and the display screen is not the set distance, so that the distance between the location of the two eyes and the display screen is the set distance, further comprises:

controlling the display screen to move under a condition that the detection result of the distance detection circuit comprises at least the case that the vertical distance between the location of the two eyes and the display screen is not the set distance and a case that a duration for which the two eyes gaze at the display screen exceeds the set value, so that the distance between the location of the two eyes and the display screen is the set distance.

13. The eye-protection display method according to claim 11, further comprising:

acquiring the set distance according to a numerical value entered manually by the user, under a condition that the distance protection mode is turned on; or, acquiring the set distance from the detection result of the distance detection circuit under a condition that the set condition is satisfied, when the distance protection mode is turned on and the display screen is adjusted to the first location by the user, wherein the set distance is the vertical distance between the location of the two eyes and the display screen located at the first location, and the set condition comprises a condition that a duration for which the two eyes gaze at the display screen exceeds the set value or a condition that the user performs a confirming operation after the display screen is adjusted to the first location.

14. The eye-protection di splay method according to claim 11, further comprising:

acquiring at least one of gazing angle information or gazing point location information of the two eyes of the reference user relative to the display screen, wherein the gazing angle information comprises an average value of two included angles between sight lines of the two eyes of the reference user and a plane in which the display screen is located, and the gazing point location information comprises information on locations of intersection points at which the sight lines of the two eyes of the reference user intersect the plane in which the display screen is located.

15. The eye-protection display method according to claim 14, wherein when a plurality of users watches the display screen, prior to detecting the distance between the location of the two eyes of the reference user and the display screen, the eye-protection display method further comprises:

acquiring gazing angle information of eyes of the plurality of users relative to the display screen; and finding a minimum value from absolute values of difference values between the gazing angle information of each of the plurality of users and 90 degrees, and determining a user corresponding to the minimum value as the reference user.

16. The eye-protection display method according to claim 14, further comprising:

determining, according to the gazing point location information, a reference point location to which the display screen is to be adjusted; and performing adjustment to an angle and a location of the display screen according to the gazing angle information, a reference point location and a current location of the display screen, so that a plane in which the display screen is located after the adjustment is performed is perpendicular to sight lines of the two eyes of the reference user and a central location of the display screen is adjusted to coincide with the reference point location.

17. The eye-protection display method according to claim 16, wherein under a condition that the gazing point location information comprises information on locations of two intersection points at which sight lines of the two eyes of the reference user intersect a plane in which the display screen is located, respectively, the reference point location is a central point of a connection line between the two intersection points; or under a condition that the gazing point location information comprises information on a location of one intersection point at which one of the sight lines of the two eyes of the reference user intersects the plane in which the display screen is located, the reference point location is the location of the intersection point.

18. The eye-protection display method according to claim 14, wherein the acquiring at least one of the gazing angle information or the gazing point location information of the two eyes of the reference user relative to the display screen, further comprises:

acquiring at least one of the gazing angle information or the gazing point location information of the two eyes of the reference user relative to the display screen, under a condition that a duration for which the two eyes gaze at the display screen exceeds a set time.

\* \* \* \* \*